United States Patent [19]
Kouchi

[11] Patent Number: 6,046,711
[45] Date of Patent: Apr. 4, 2000

[54] IMAGE DISPLAY DEVICE

[75] Inventor: Tetsunobu Kouchi, Hiratsuka, Japan

[73] Assignee: Canon Kabushiki Kaisha, Tokyo, Japan

[21] Appl. No.: 08/357,381

[22] Filed: Dec. 16, 1994

[30]       Foreign Application Priority Data

Dec. 21, 1993  [JP]  Japan .................................... 5-344761

[51] Int. Cl.⁷ .................................................. G09G 5/00
[52] U.S. Cl. ................. 345/8; 345/98; 345/100; 345/118; 345/121; 348/550; 348/792
[58] Field of Search ............................ 345/98, 100, 118, 345/55, 121, 132; 348/550, 443, 792, 793, 555, 790

[56]             References Cited

U.S. PATENT DOCUMENTS

| | | | |
|---|---|---|---|
| 5,150,107 | 9/1992 | Kurisu | 340/724 |
| 5,281,957 | 1/1994 | Schoolman | 345/8 |
| 5,357,290 | 10/1994 | Horibe | 348/792 |
| 5,406,308 | 4/1995 | Shiki | 345/127 |
| 5,414,544 | 5/1995 | Aoyagi et al. | 345/8 |
| 5,444,491 | 8/1995 | Lim | 348/441 |
| 5,486,841 | 1/1996 | Hara et al. | 345/8 |
| 5,493,317 | 2/1996 | Kim | 345/213 |
| 5,579,026 | 11/1996 | Tabata | 345/8 |

FOREIGN PATENT DOCUMENTS

| | | |
|---|---|---|
| 0563737 | 10/1993 | European Pat. Off. . |
| 0607778 | 7/1994 | European Pat. Off. . |
| 2-143781 | 6/1990 | Japan . |
| 3189683A | 8/1991 | Japan ............................ G09G 1/00 |
| 2113949 | 8/1983 | United Kingdom . |

OTHER PUBLICATIONS

Patent Abstracts of Japan, vol. 14, No. 391 (E–968) Aug. 23, 1990 & JP–A–02 143 781 (Toshiba Corp) Jun. 1, 1990 *abstract*.

*Primary Examiner*—Bipin H. Shalwala
*Assistant Examiner*—Vincent E. Kovalick
*Attorney, Agent, or Firm*—Fitzpatrick, Cella, Harper & Scinto

[57]                ABSTRACT

An image display device for arbitrarily switching a display area includes a drive signal supply device for supplying drive signals for pixels arranged in a matrix-like fashion, in response to the generation of predetermined signals, in signal lines of rows and columns corresponding to the pixels, and sequential signal output devices for sequentially outputting the predetermined signals from a signal line of a predetermined start row or column to the signal lines of rows or columns at least with respect to either the rows or columns. The sequential signal output devices are equipped with a switching device for switching the start row or column.

2 Claims, 17 Drawing Sheets

TRUTH TABLE

| φA | φB | NODE (1) | (2) | (3) | (4) |
|---|---|---|---|---|---|
| 1 | 1 | 1 | 0 | 0 | 0 |
| 1 | 0 | 0 | 1 | 0 | 0 |
| 0 | 1 | 0 | 0 | 1 | 0 |
| 0 | 0 | 0 | 0 | 0 | 1 |

IMAGE DISPLAY DEVICE

BACKGROUND OF THE INVENTION

1. Field of the Invention

The present invention relates to an image display device, such as an LCD (liquid crystal display), a PDP (plasma display), and an LED (light emitting diode), and, in particular, to the drive section of an image display device.

2. Description of the Related Art

Liquid crystal displays have been commercially manufactured as flat panel displays or projection TV. An example of the liquid crystal display is an active matrix type display using TN liquid crystal. In the active matrix type display, each pixel is equipped with an active matrix element, such as TFT (thin film transistor), a diode element, or an MIM (metal insulator metal). Due to its switching characteristics, the active matrix element maintains a voltage application state for a period substantially longer than the line selection period for the TN liquid crystal, which is rather slow in response, thereby assisting the liquid crystal in optical switching response. Further, by thus maintaining the voltage application state for a liquid crystal having no memory property (self-holding property), the active matrix element provides a substantial memory state for one frame. Further, theoretically, it allows no crosstalk between lines or between pixels, thereby providing a satisfactory display property.

FIG. 16 shows the drive circuit of an active matrix type display. The drive circuit shown in FIG. 16 comprises: a pixel section composed of a liquid crystal cell 1401 having a liquid crystal material sealed in a space defined between a common electrode (at potential VcoM) and each pixel electrode, and a pixel TFT 1402; an image signal wiring section (hereinafter referred to as "signal wiring") 1403; a line buffer section 1404; a shift pulse switch 1408; an output switch 1410, a horizontal shift register 1405, gate signal wiring (hereinafter referred to as "gate wiring"); and a vertical shift register 1406. Recording signals are sequentially transferred from a signal input terminal 1407 to the pixels or lines with a shifted timing.

FIGS. 17(a) and 17(b) show the drive pulse timing of this conventional active matrix liquid crystal display device. The drawings illustrate the display device with respect to a line sequential drive method. That is, the recording of image signals to be recorded in the liquid crystal is effected as follows: image signals corresponding to one line information are recorded in the buffer section 1404 through the shift pulse switch 1408, driven by the horizontal shift register 1405 emitting an output in synchronism with the frequencies of the image signals (FIG. 17(a)). After the image signals corresponding to all the pixels of a line have been recorded in the line buffer section 1404, an image signal is recorded in each liquid crystal cell through the pixel switch turned ON by the output switch 1410 of the line buffer section 1404 and the vertical shift register 1406. The signal transfer to each liquid crystal cell is generally effected collectively for one line during the blanking period in the horizontal scanning. With the above-described timing, the image signals are sequentially transferred to the pixels (FIG. 17(b)).

The liquid crystal molecules constituting the cell move in response to the signal voltage thus transferred, whereby the transmissivity of the liquid crystal cell changes according to the direction of a deflection plate separately provided in a cross polarizer relationship. A difference in this transmissivity constitutes the density of each pixel, whereby the liquid crystal cell operates as a display means.

However, in this conventional construction, the display area of an image is uniquely determined by the connecting relationship between the horizontal shift register, the vertical shift register and the display pixels. This leads to the problem, for example, that a difference exists in the number of display pixels between the NTSC and PAL television systems. Conventionally, dedicated display pixels have been respectively designed for each of these systems, resulting in a large amount of time and labor being required for the designing. Further, it has been necessary for the two different types of dedicated display devices for these systems to be separately manufactured.

Naturally, it has been impossible to use a display device intended for one system in an area where the other broadcasting system has been adopted. An attempt to make a display device compatible with both systems would meet with the following difficulty: when a display is to be given on the NTSC system by using a device designed for the PAL system, a PAL system image area 162 is larger than a display device area 161 for the NTSC system, as shown in FIG. 18(a), so that it is impossible to display the entire signal on the PAL system. Conversely, when a display is to be given on the NTSC system by using a display device designed for the PAL system, the display position is restricted by the start position of the shift register, so that, as shown in FIG. 18(b), the center of the image does not coincide with the display device center 163, with the result that an area with no image signal is generated.

SUMMARY OF THE INVENTION

In view of the above problems in the prior art, it is an object of the present invention to provide an image display device in which the display area can be arbitrarily switched so that the display device is compatible with different display systems.

To achieve this object, according to the present invention, there is provided an image display device comprising: drive signal supply means for supplying drive signals for pixels, arranged in a matrix-like fashion, in response to generation of predetermined signals in signal lines of rows and columns respectively corresponding to the pixels; and sequential signal output means for sequentially outputting the above-mentioned predetermined signals to the respective signal lines of the rows or columns from a signal line of a predetermined start row or column at least with respect to either the rows or columns, wherein the sequential signal output means is equipped with switching means for switching the above-mentioned start row or column.

The sequential signal output means is equipped with a shift register which outputs, for example, shift pulses in response to input drive pulses sequentially from shift pulse output means of different stages as the above-mentioned predetermined signals, and which starts this output of shift pulses in response to an input start pulse. The shift pulse output means of each stage outputs shift pulses on condition that shift pulses are output in the previous stage or that the above-mentioned start pulse is applied to it. The above-mentioned switching means switches the above-mentioned start row or column by switching the shift pulse output means to which the start pulse is applied. Alternatively, the above-mentioned start row or column may be switched as follows: the sequential signal output means is equipped with an output terminal for sequentially outputting the above-mentioned predetermined signals, and a shift register connected thereto and adapted to sequentially generate the above-mentioned predetermined signals. The above-mentioned switching means switches the start row or column by switching the connection between this shift register and the above-mentioned output terminal.

The present invention is applicable to any image display device having a shift register, for example, a simple matrix type LCD, a plasma display device, or a light emitting diode device, to say nothing of an active-matrix type LCD. The image display device of the present invention is also applicable to a particular type stereoscopic display. In this case, the switching by the above-mentioned switching means is conducted in response to a movement of the viewer. Further, the image display device of the present invention is also applicable to a head-mount-display type display device. In this case, the switching by the above-mentioned switching means is conducted in various display modes, such as a stereoscopic display mode, a mode for plane image display of a wide angle of view, and a mode for stereoscopic and plane image display.

In this system construction, the image signals input to the image display device are supplied as signals forming drive signals for corresponding pixels in response to the generation of the above-mentioned predetermined signals. For example, in the case of line sequential drive, the above-mentioned signals for columns are sequentially supplied to the signal lines of the columns as selection signals, and, the above-mentioned predetermined signals for rows are utilized in parallelizing the image signals, and these parallelized signals are supplied to the pixels of the rows corresponding to the selected column. In doing so, the start row or column is switched, whereby the row and column at which the supply of the selected signal, the parallelized image signals, etc. is to be started are switched, and the display of the image is started from that start row or column onward. Accordingly, the image display area can be arbitrarily switched on a screen capable of display in accordance with the proper display area of the supplied image signal. For example, in a display device for the PAL system, the start row and column are switched such that an NTSC system image, having a smaller number of pixels, can be displayed at the center of the screen.

DESCRIPTION OF THE PREFERRED EMBODIMENTS

Figure 1:
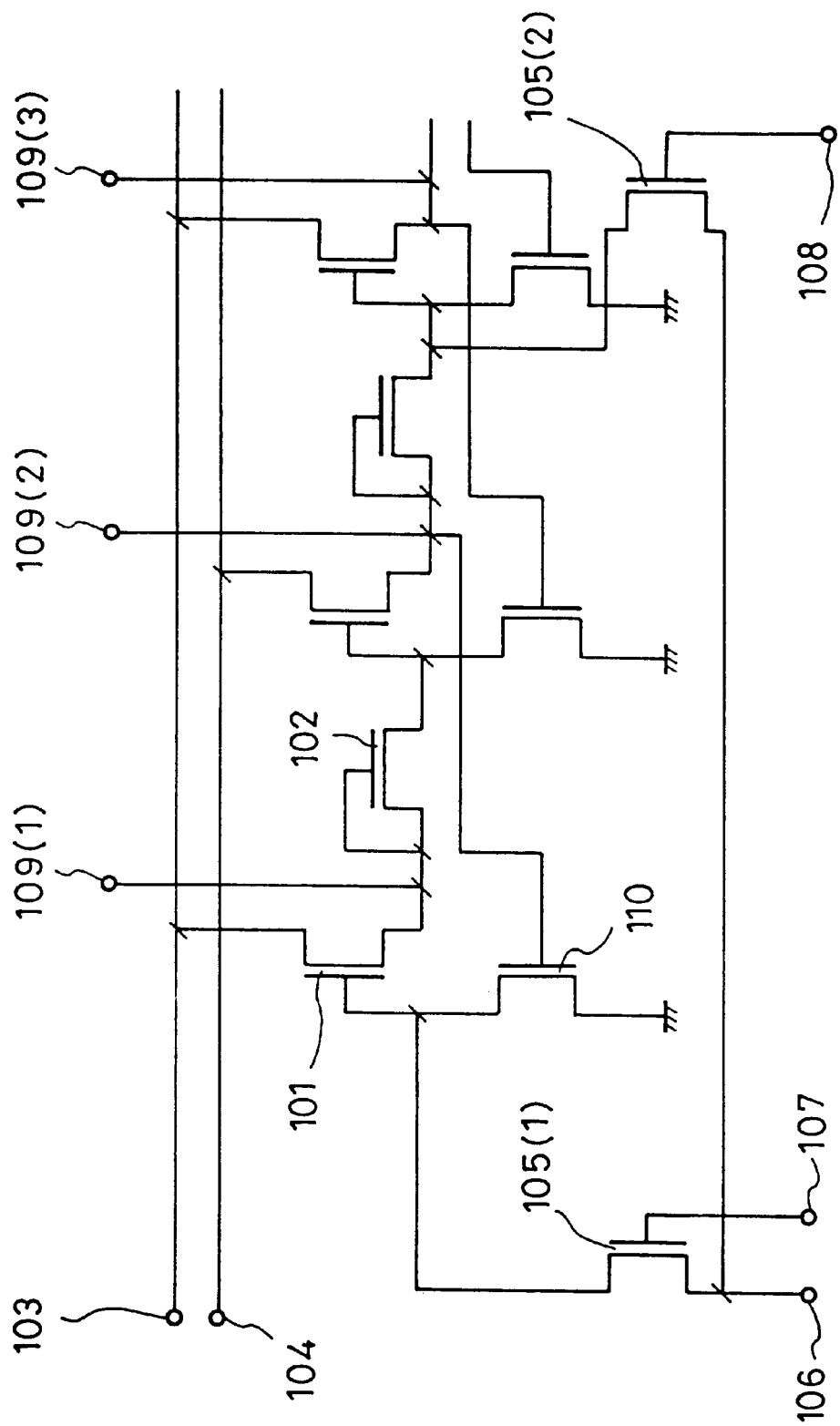
FIG. 1 is a schematic circuit diagram of a first embodiment.
Figure 16:
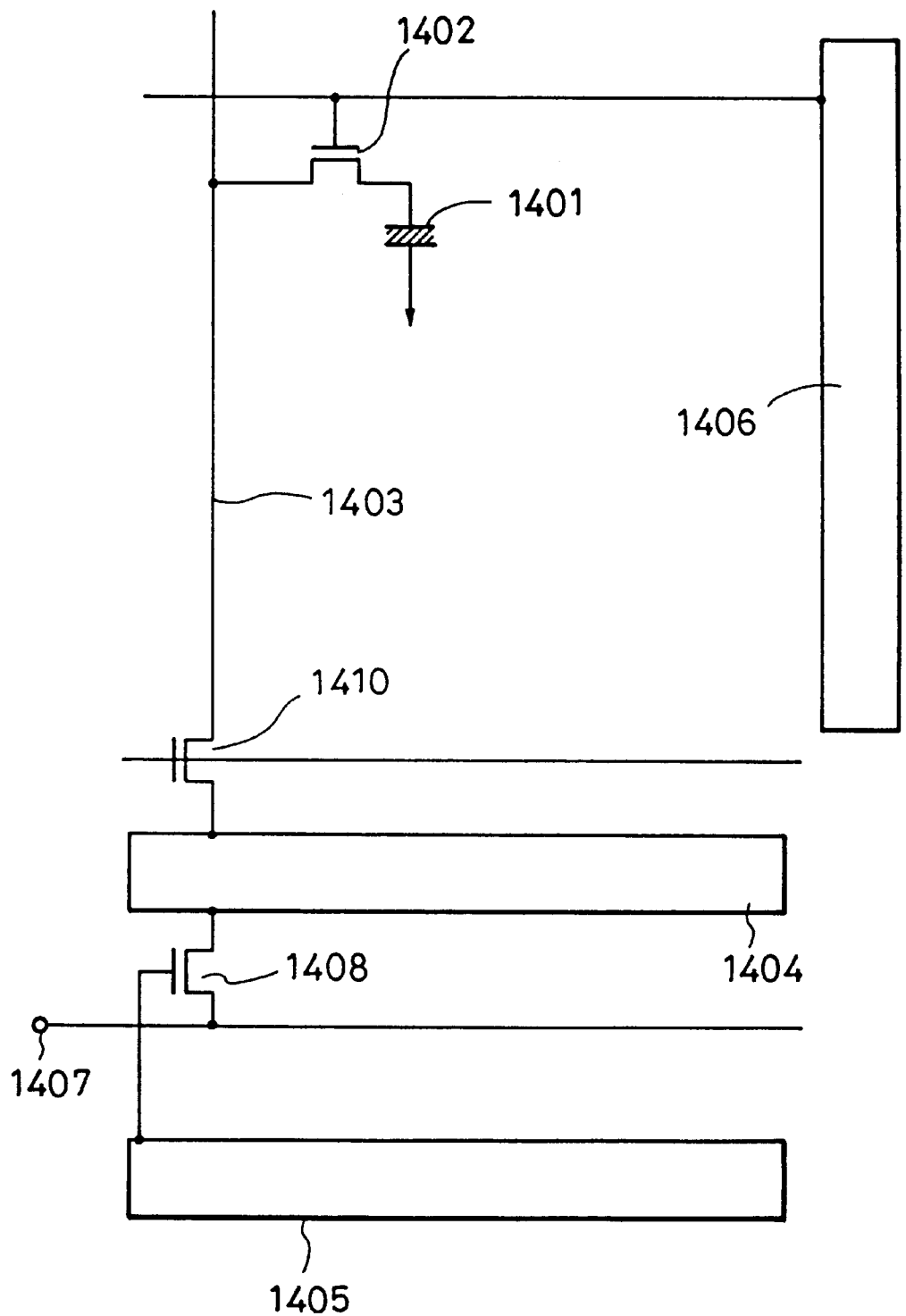
FIG. 16 is a schematic circuit diagram of a conventional liquid crystal display device.
Figure 17A:
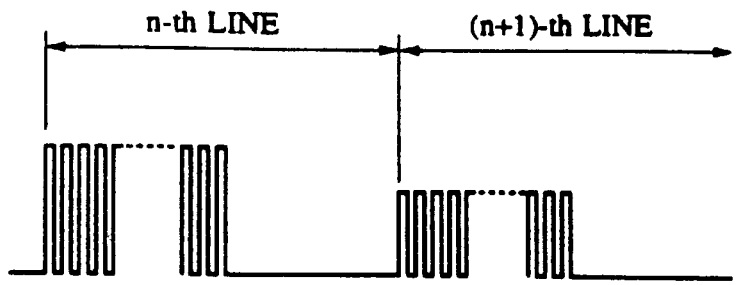
FIGS. 17(a) and (b) constitute an operation timing chart of a conventional liquid crystal display device.
Figure 17B:
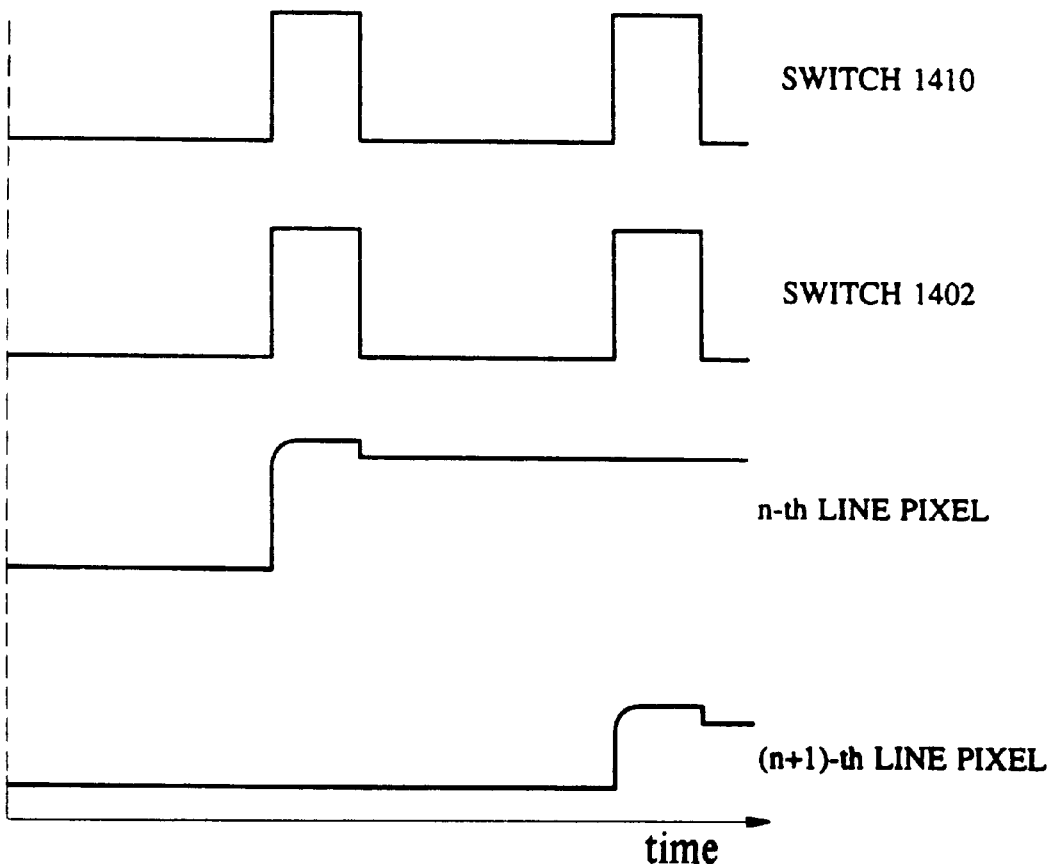
Figure 18A:
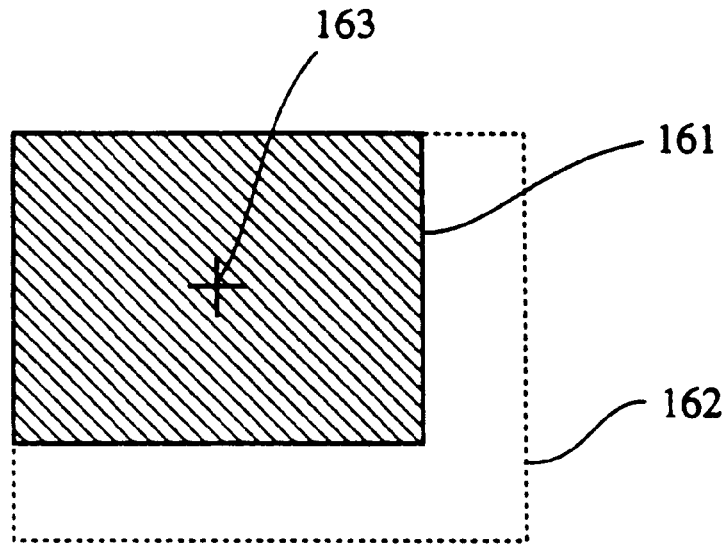
FIGS. 18(a) and (b) constitute a schematic diagram showing a display example of a conventional liquid crystal display device.
Figure 18B:
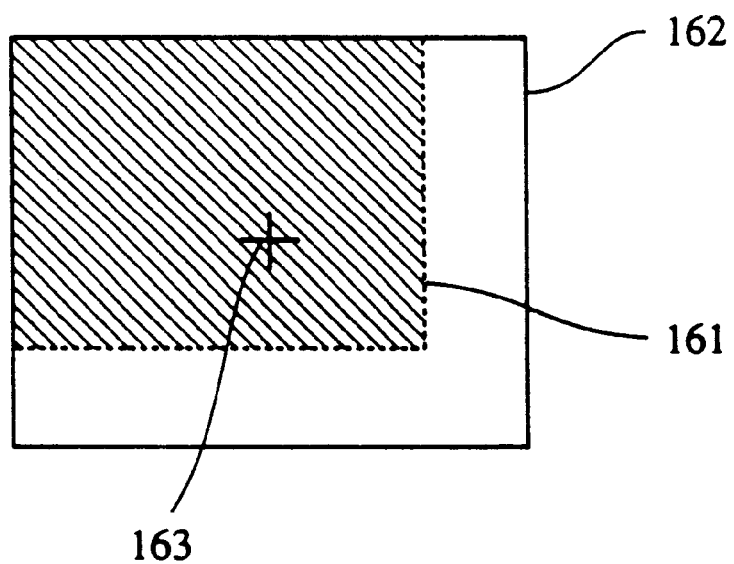

FIG. 1 is a schematic circuit diagram showing a shift register section of an image display device according to the first embodiment, which most clearly exhibits the features of the present invention. In this embodiment, the present invention is applied to a device having a bootstrap type shift register. The section of the device shown in FIG. 1 corresponds to the horizontal shift register 1405 or the vertical shift register 1406 of FIG. 16. In FIG. 1, numeral 101 indicates a drive transistor; numeral 102 indicates a pre-charge transistor; numeral 103 indicates a first clock line for transmitting a first drive pulse; numeral 104 indicates a second clock line for transmitting a second drive pulse; numerals 105(1) and 105(2) indicate transfer transistors for transferring a start pulse; numeral 106 indicates a start pulse input terminal; numerals 107 and 108 indicate start position switching signal input terminals; and numeral 110 indicates a reset transistor for grounding the gate line of the drive transistor 101. Numerals 109(1)–(3) indicate output terminals of the shift register. In the case of a horizontal shift register, it is connected to the gate of the shift pulse switch 1408, and, in the case of a vertical shift register, to the gate of the pixel TFT 1402 of FIG. 16.

The operation of this embodiment will be described with reference to the drive pulse timing chart shown in FIG. 2. As shown in portion (a) of FIG. 2, the transfer transistor 105(1) is turned on by a switching signal 1, and a start pulse is applied from the terminal 106 to the gate of the drive transistor 101 in the first stage of the shift register, thereby turning on the drive transistor 101. Next, when the first drive pulse is applied from the first clock line 103, as shift pulse is output to the output terminal 109 (1), and, at the same time, the gate of the drive transistor of the next stage is pre-charged through the pre-charge transistor 102. Drive pulses are then applied alternately, whereby shift pulses are sequentially output to the output terminals 109 (2), 109 (3), etc.

The start pulse supplied to the terminal 106 will now be described. A horizontal or vertical synchronous signal is separated from a video signal. From this synchronous signal, counting is performed by a predetermined pulse counter to output a start pulse with a predetermined timing. A PLL (phase locked loop) circuit or the like is used for the synchronization with the synchronous signal.

Figure 2:
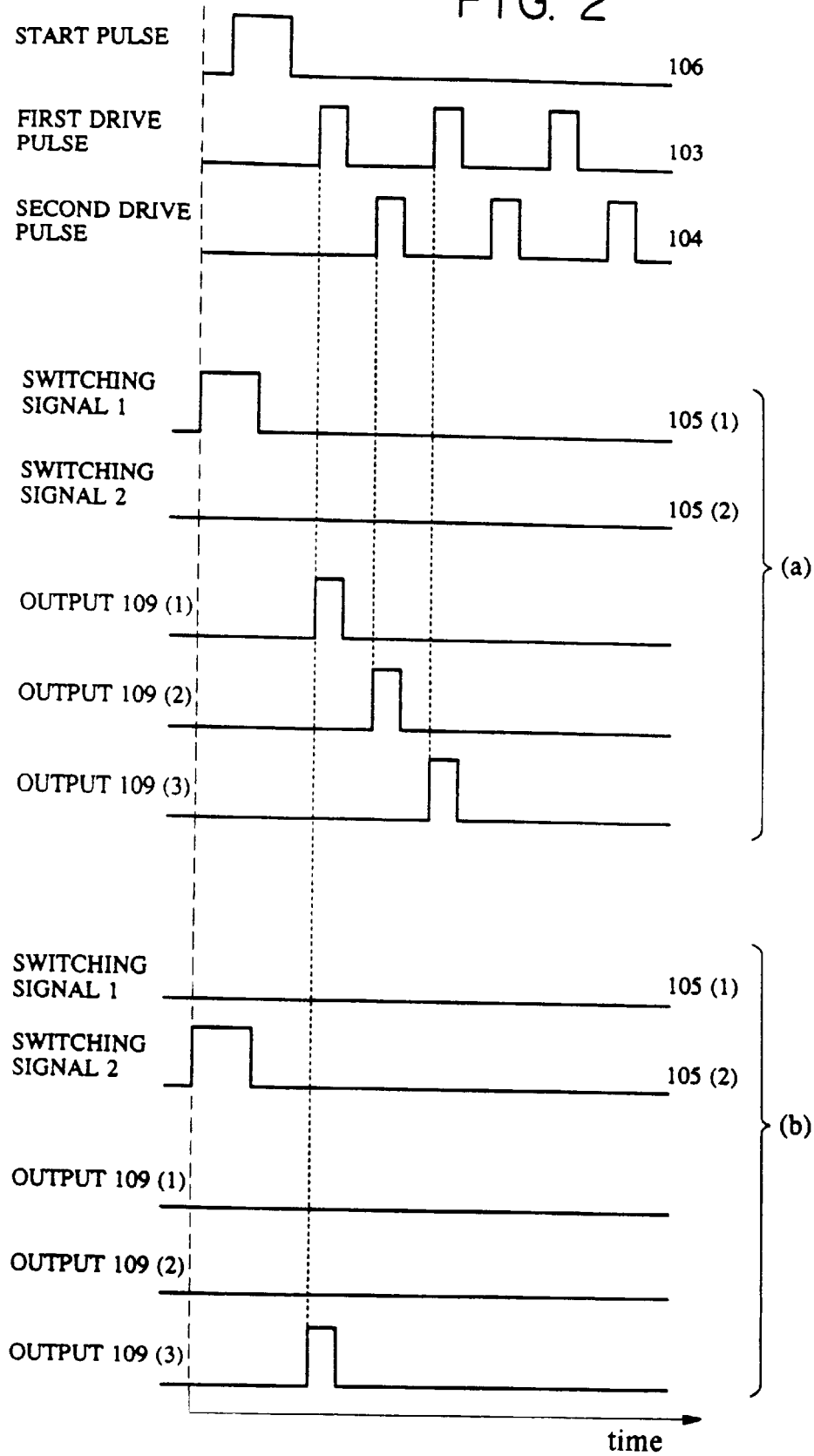
FIG. 2 is a drive pulse timing chart of the first embodiment.

As shown in portion (b) FIG. 2, when the transfer transistor 105 (2) is turned on by a switching signal 2, and the transistor 105 (1) is kept in the OFF state, the shift register starts output from the output terminal 109 (3), and the terminals 109 (1) and (2) do not output. In this case, the gate signal wiring or the shift pulse switch 1408 of FIG. 16 operates from the third stage onward, and, in correspondence therewith, an image display is given from the third stage onward.

In this way, a means for switching the start pulse applying position is provided so that a switch pulse is applied to an arbitrarily selected position, whereby it is possible to arbitrarily switch the display area in a single display device.

(Second Embodiment)

Figure 3:
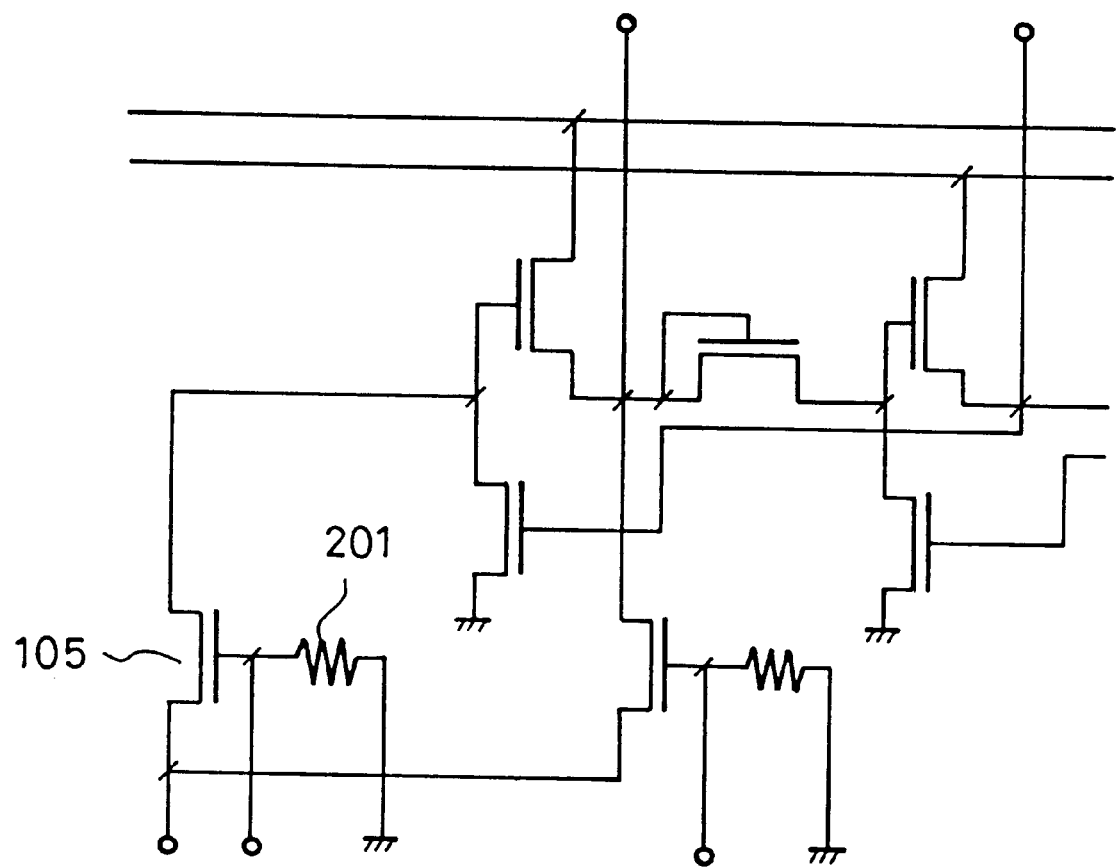
FIG. 3 is a schematic circuit diagram of a second embodiment.

FIG. 3 is a schematic circuit diagram of the shift register section of an image display device according to the second embodiment of the present invention. In the drawing, numeral 201 indicates a pull-down resistor, which is connected to the gate of the transfer transistor 105.

Due to the provision of the pull-down resistor, it is possible to apply from the outside a switching signal exclusively to a terminal to which a start pulse is to be applied.

Further, though this makes a bidirectional switching impossible, it is possible to connect a resistor or a fuse element to the gate of the transfer transistor 105, and arbitrarily open or short-circuit these components through application of a laser beam or a large current or voltage, thus making it possible to switch the display area without steadily applying a switching signal.

(Third Embodiment)

Figure 4:
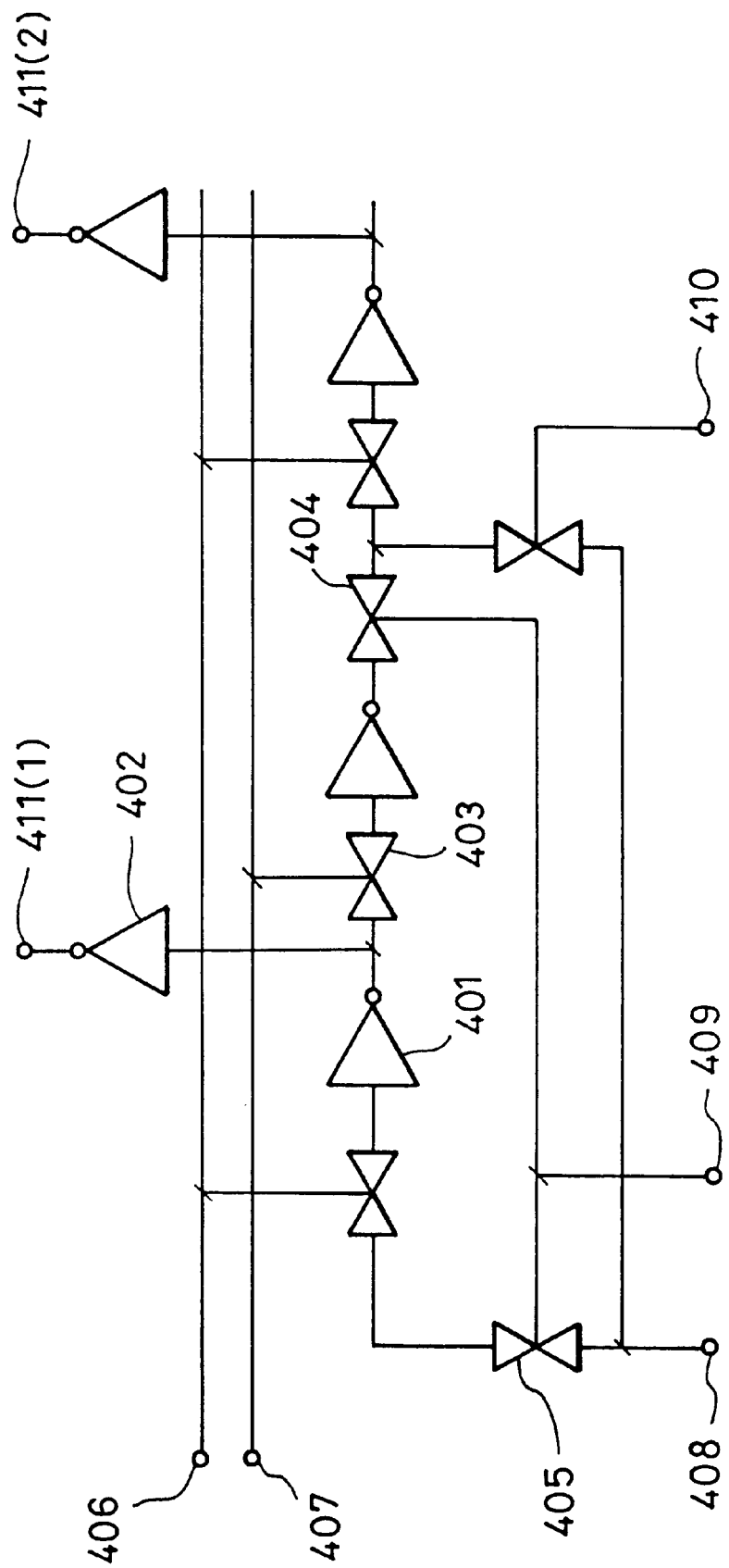
FIG. 4 is a schematic circuit diagram of a third embodiment.

FIG. 4 shows the third embodiment of the present invention. This embodiment is applied to a CMOS type shift register. In the drawing, numerals 401 and 402 indicate inverters; numerals 403 through 405 indicate transfer gates; numeral 406 indicates a first clock line for transmitting a first drive pulse; numeral 407 indicates a second clock line for transmitting a second drive pulse; numeral 408 indicates a start pulse input terminal; and numerals 409 and 410 indicate a start-position-switching-signal input terminal connected to the transfer gate 405.

Figure 5:
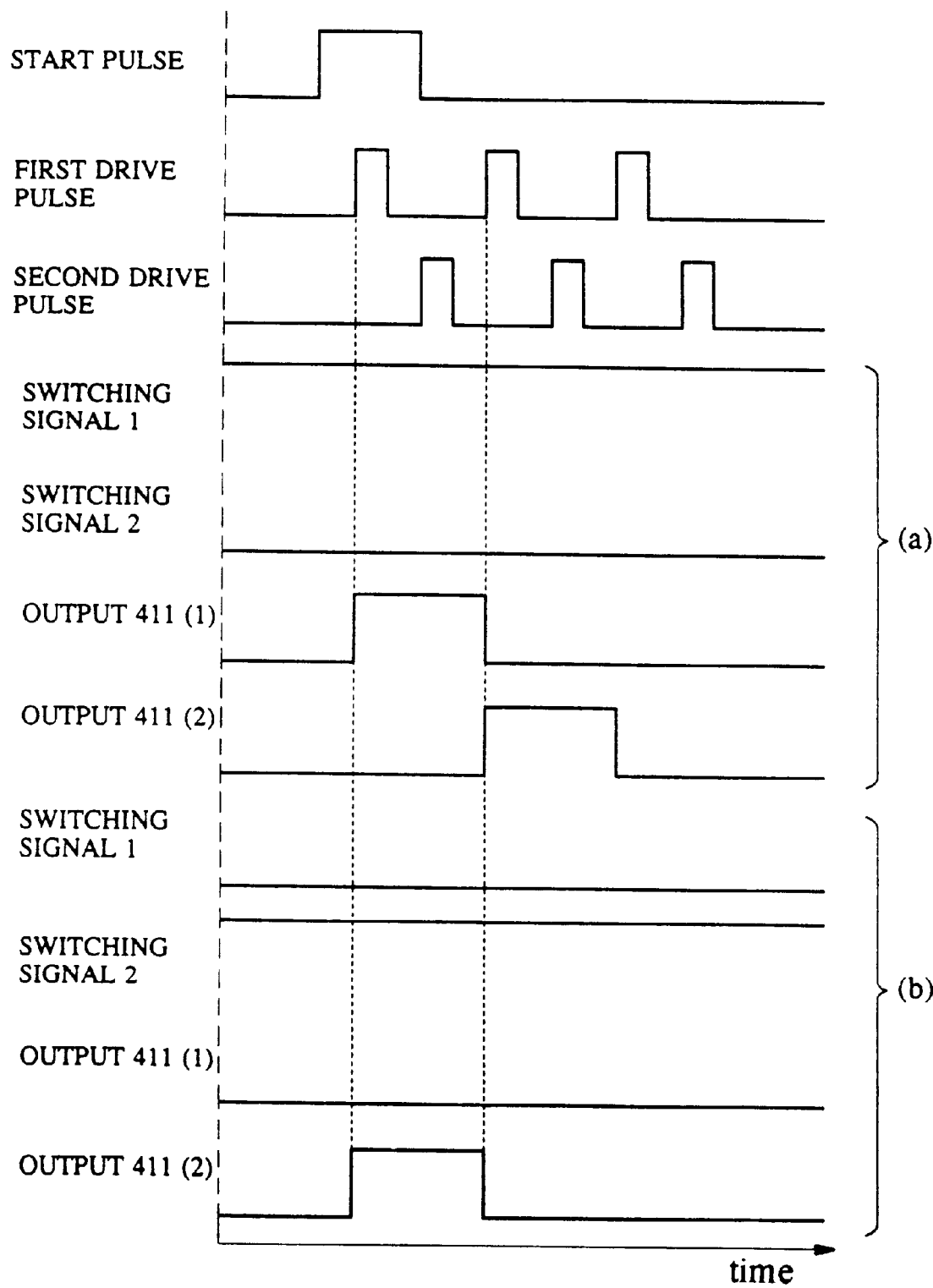
FIG. 5 is a drive pulse timing chart of the third embodiment.

The operation of this embodiment will be described with reference to the drive pulse timing chart shown in FIG. 5. In portion (a) of FIG. 5, when a start pulse is applied starting from the first stage by switching signal 1, shift pulses are sequentially output from the output terminals 411 (1), 411 (2), etc. When, as shown in portion (b) of FIG. 5, a start pulse is applied to the second stage by switching signal 2, shift pulses are output from the output terminal 411 (2), but not from the output terminal 411 (1). By adopting the construction of this embodiment, it is possible to obtain the same effect as that of the first embodiment.

Figure 6:
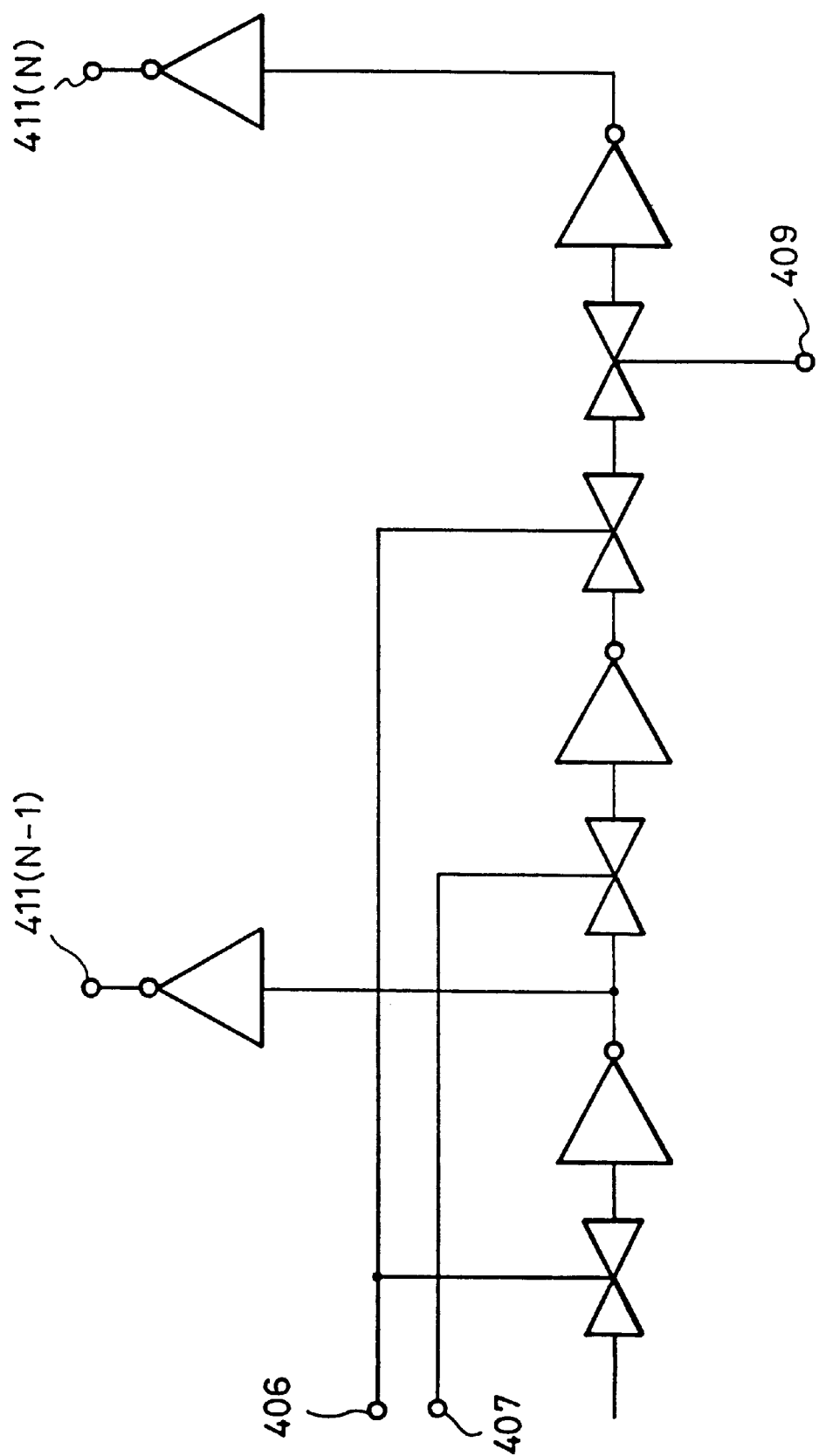
FIG. 6 is a schematic circuit diagram of an end section of a shift register of the third embodiment.

FIG. 6 shows the section of the shift register which is near the endmost stage thereof. In the drawing, when a start position switching signal is input to the input terminal 409, the shift pulse is transferred to the final stage, and output to the output terminal 411 (N). When the start position switching signal is low level, the shift pulse is output to the output terminal 411 (N−1), and is not transferred, any further. By adopting this construction, it is possible to also switch the display position in the last half of a display area.

(Fourth Embodiment)

Figure 7:
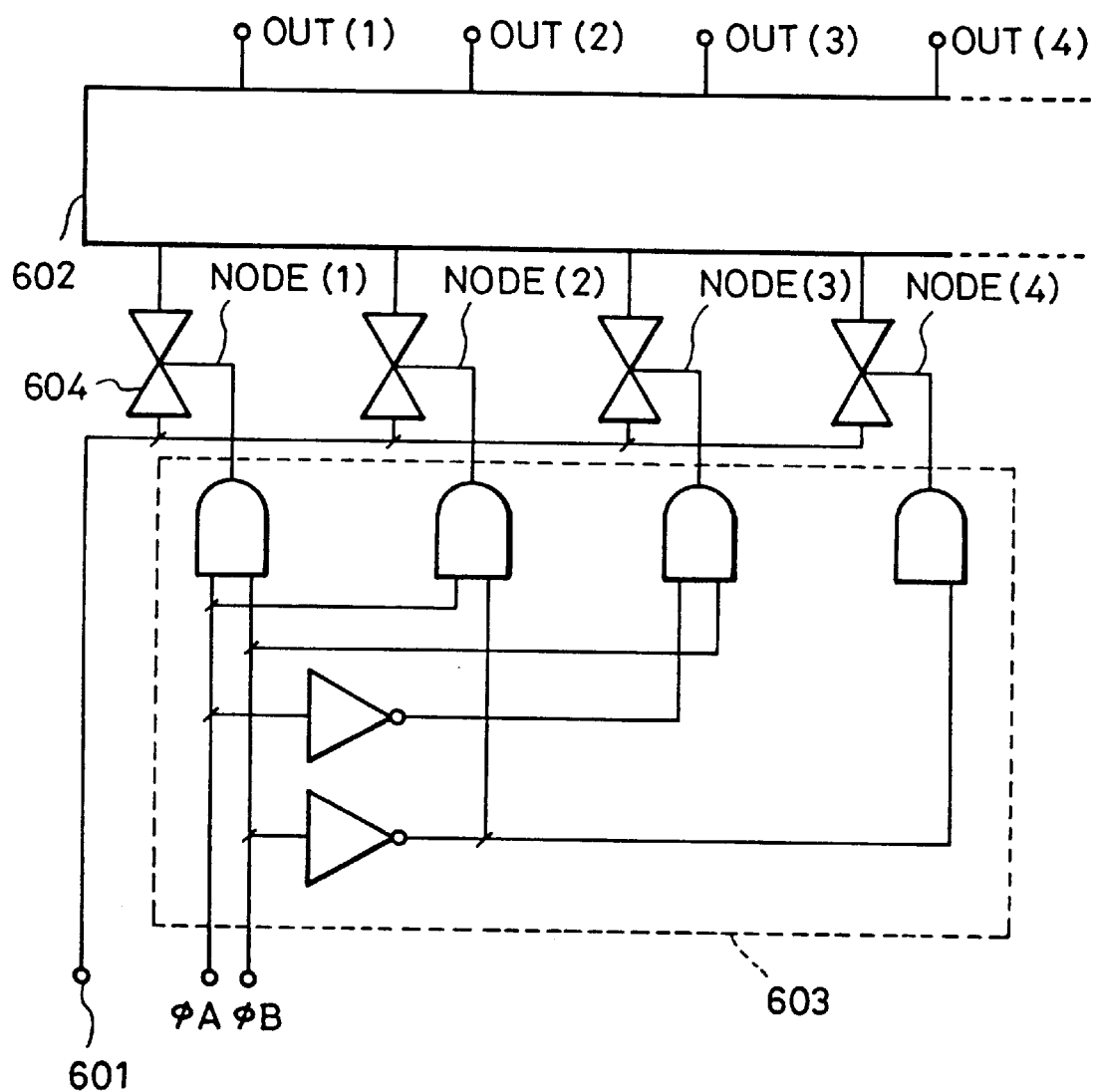
FIG. 7 is a schematic circuit diagram of a fourth embodiment.

FIG. 7 shows the fourth embodiment of the present invention. In this embodiment, switching can be performed efficiently when there are two or more start pulse switching positions. By way of example, the drawing illustrates a case in which the switching of the start pulse applying position is effected between four positions by using two switching signals. In the drawing, numeral 601 indicates a start pulse input terminal; numeral 602 indicates a shift register; numeral 603 indicates a logic circuit; and numeral 604 indicates a transfer gate. The transfer gate 604 is turned ON/OFF by signals applied to nodes (1) through (4) to perform the operation of switching the start pulse applying position in the shift register. The signals applied to the nodes (1) through (4) are subjected to computation on the basis of clocks φA and φB, and a truth table, as shown in FIG. 8, is obtained, whereby it is possible to perform setting such that shift pulses are sequentially output from an arbitrary one of output terminals OUT (1) through OUT (4).

While this embodiment has been shown with reference to the case in which switching between four positions is effected with two switching signals (φA and φB), it is possible to effect switching between a larger number of positions with a minimum number of switching signals by changing the construction of the logic circuit 603.

(Fifth Embodiment)

Figures 8, 9:
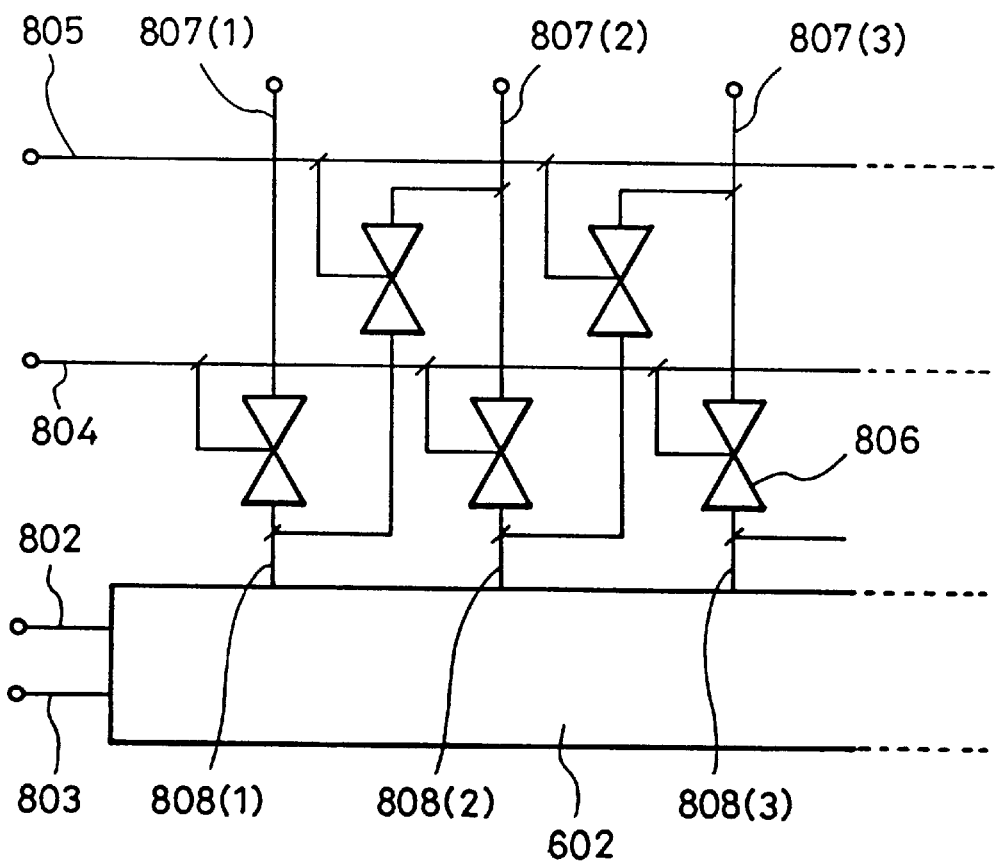
FIG. 8 is an operation illustrating table of the fourth embodiment.
FIG. 9 is a schematic circuit diagram of a fifth embodiment.

FIG. 9 shows the fifth embodiment of the present invention. In this embodiment, the target of connection of the output of the shift register is switched. In the drawing, numeral 802 indicates a start pulse input terminal of a shift register 602; numeral 803 indicates a drive pulse input terminal of the shift register 602; numerals 804 and 805 indicate output switching signal input terminals; and numeral 806 indicates a transfer gate. Numeral 807 indicates an output terminal. When the shift register 602 is a horizontal shift register, it is connected to the gate of the shift pulse switch 1408 of FIG. 16. When the shift register 602 is a vertical shift register, it is connected to the gate of the pixel TFT 1402 of FIG. 16. Numeral 808 indicates an output terminal of the shift register 602. The output terminal 808 is connected to the output terminal 807 through the transfer gate 806.

When a switching signal is applied to the terminal 804, the shift register output terminal 808 (1) is connected to the output terminal 807 (1) through the transfer gate 806. Similarly, the output terminals 808 (2) and 808 (3) are sequentially connected to the output terminals 807 (2) and 807 (3), respectively, whereby shift pulses are output. When a switching signal is applied to the terminal 805, the output of shift pulses is shifted by one line. That is, the terminal 808 (1) is connected to the terminal 807 (2), and the terminal 808 (2) is connected to the terminal 807 (3).

In this way, by constructing the circuit such that the target of connection of the output of the shift register is switched, it is possible to obtain the same effect as that of the above-described embodiments.

(Sixth Embodiment)

Figure 10:
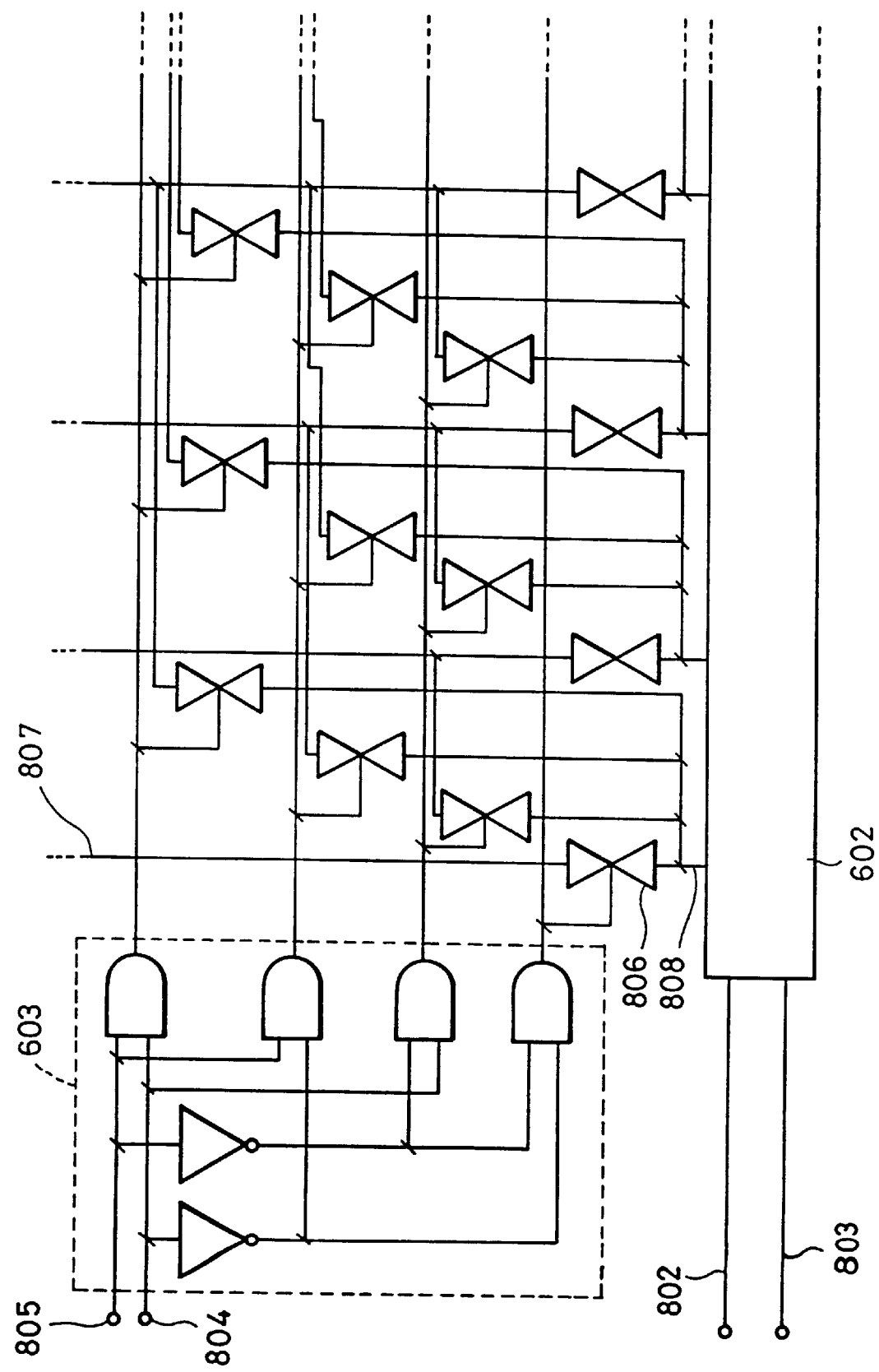
FIG. 10 is a schematic circuit diagram of a sixth embodiment.

While in the fifth embodiment switching is effected between two positions, FIG. 10 shows the sixth embodiment in which the logic circuit 603 is used, as in the fourth embodiment, so as to effect switching between a larger number of positions with a minimum number of switching signals.

(Seventh Embodiment)

Figure 11:
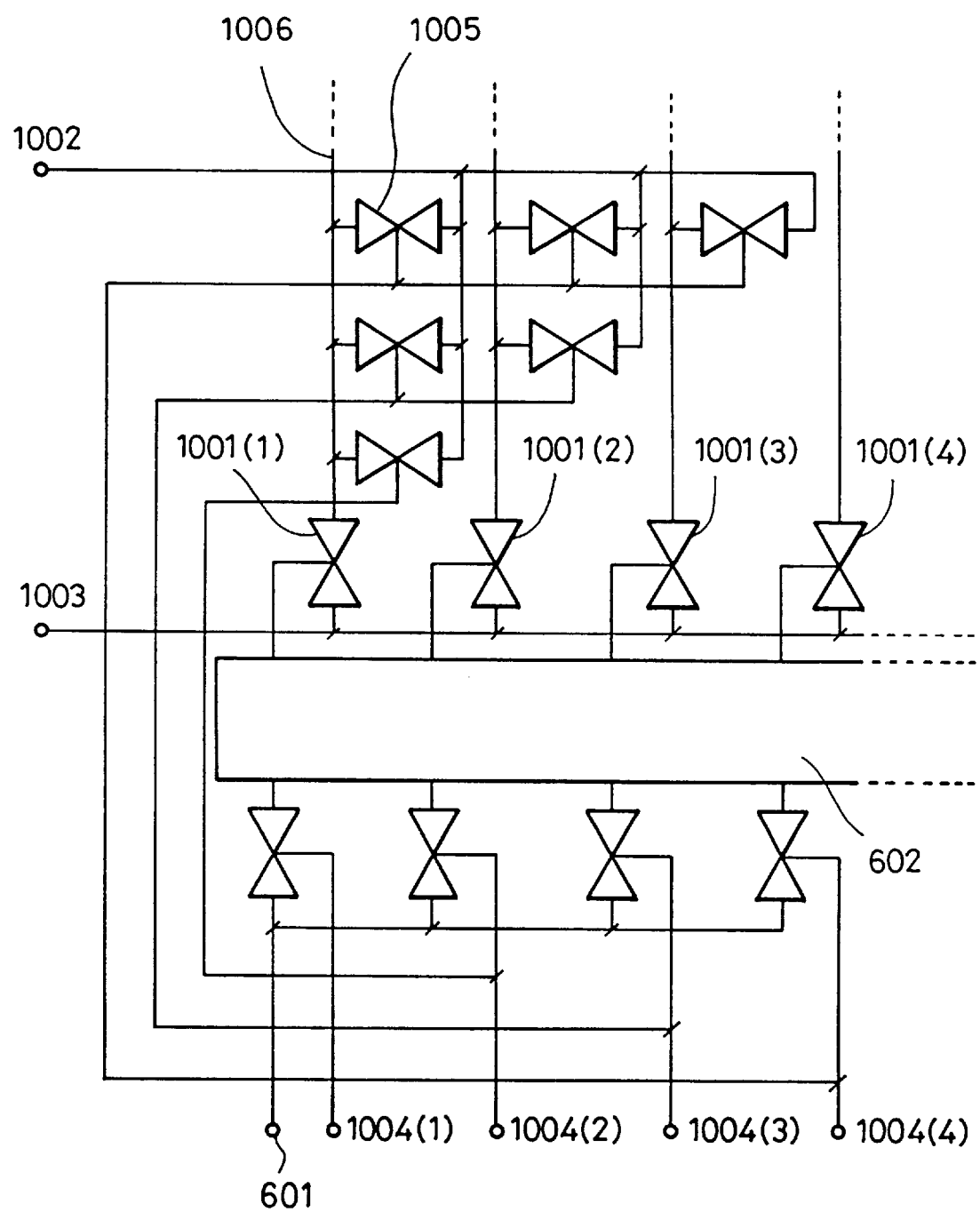
FIG. 11 is a schematic circuit diagram of a seventh embodiment.

FIG. 11 shows the seventh embodiment of the present invention. Numerals 1001(1)–(4) indicate transfer gates, which correspond to the shift pulse switch 1408 of FIG. 16. Numeral 1002 indicates a dummy signal input terminal; numeral 1003 indicates an image signal input terminal; numerals 1004(1)–(4) indicate start position switching signal input terminals of the shift register 602; and numeral 1005 indicates a transfer gate for dummy signal input. Numeral 1006 indicates output terminals. The output terminals 1006 are connected to the line buffer section 1404 in FIG. 16. In the case of a construction having no line buffer, these output terminals are connected to the image signal wiring 1403.

Figure 12:
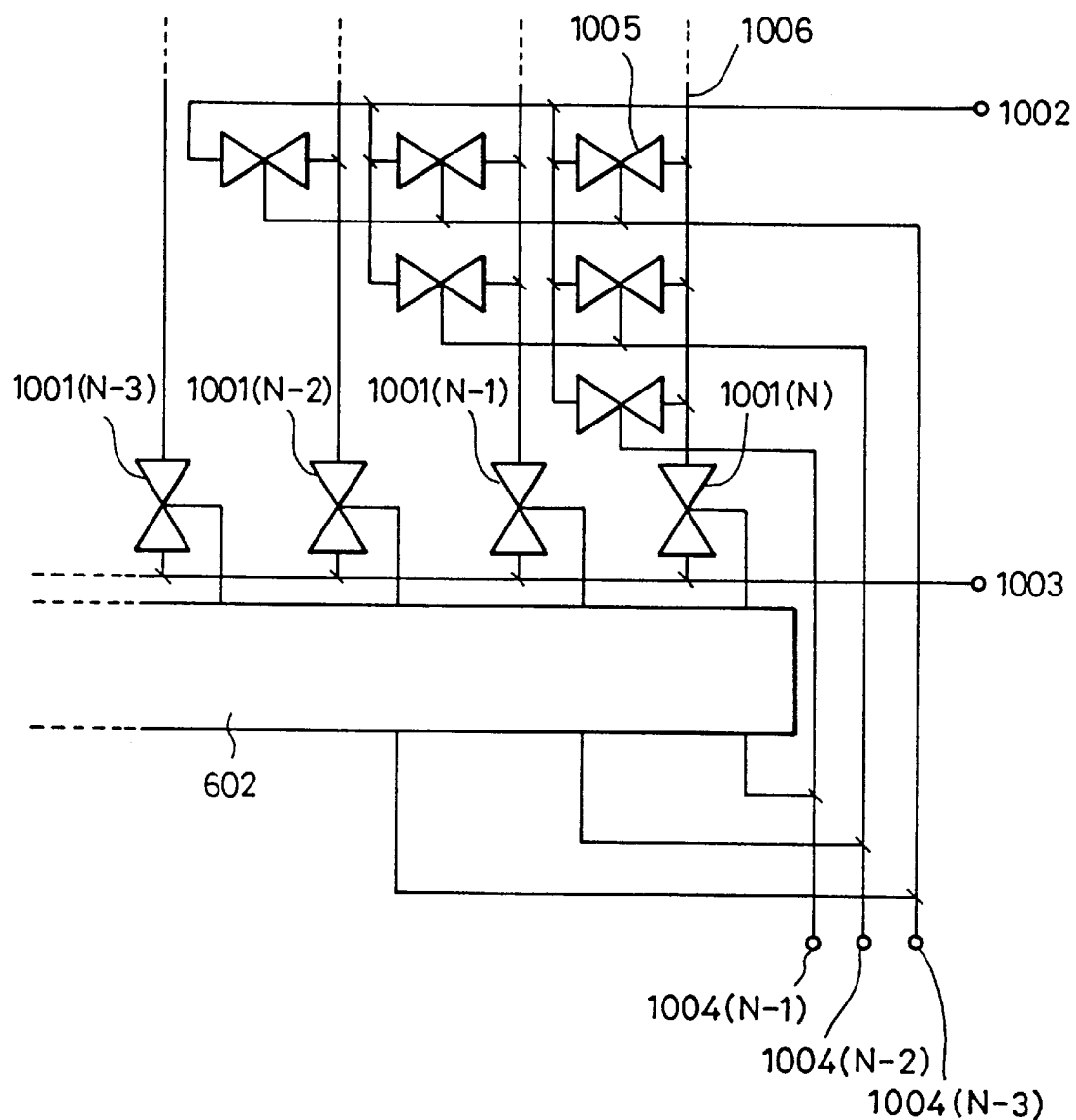
FIG. 12 is a diagram showing the portion of the signal transfer circuit of the seventh embodiment which is near the endmost section thereof.

FIG. 12 shows the portion of the signal transfer circuit section near the final stage thereof. In the drawing, when, for example, a start position switching signal is applied to the terminal 1004 (N−1), shift pulses are only output to the second to last stage of the shift register, as described with reference to FIG. 6, so that the transfer gate 1001 (N) always remains OFF. At this time, the transfer gate 1005 connected to the output terminal of the final stage is turned on to input a dummy signal.

Generally speaking, in a liquid crystal display device using TN liquid crystal, the polarity of the image signal applied is changed frame by frame in order to prevent burning of the liquid crystal molecules. In this embodiment, when the image display area is shifted, a dummy signal is also supplied to a pixel connected to a row to which no shift pulses of the shift register are supplied, thereby achieving an improvement in terms of display quality.

In the drawing, when a start position switching signal is applied, for example, to the terminal 1004 (2), shift pulses are output from the second stage of the shift register, and the transfer gate 1001 (2) is turned on to input a dummy signal. At the same time, the transfer gate 1005 connected to the first output terminal is turned on to input a dummy signal. In this process, each input dummy signal is used in its proper way, thus making it possible to freely set the display of the device portion other than the image display area, selecting black display, white display, or half-tone display according to the intended purpose. By changing the polarity of the dummy signal level for each frame or for each horizontal period, it is also possible to solve the above-mentioned problem of the burning of the liquid crystal molecules.

(Eighth Embodiment)

Nowadays, there is, on various fronts, a rapidly growing interest in stereoscopic image display techniques. In the field of television technology, there is a strong demand for the advent of a stereoscopic television capable of reproducing an image having a realistic appearance.

A lenticular type stereoscopic display is known as a system suitable for stereoscopic display of a moving picture, as in the case of television. In the lenticular type stereoscopic display, right and left images are alternately arranged in a stripe-like fashion in a focal plane of a semi-cylindrical, stripe-like lens plate. By the effect of this lens plate, the stripe images separately enter the right and left eyes, so that a stereoscopic image can be viewed without using spectacles or the like. However, this system is not without its problems. In the case of a two-eye system in which a pair of (right and left) images are projected, the range in which stereoscopic view is possible is restricted to the distance between the pupils of the eyes. In view of this, a multi-eye system, an optical system moving system, etc., have been proposed as a means for expanding the range in which stereoscopic view is possible. In the multi-eye system, a range of movement of the eyes of a viewer is assumed, and a large number of right and left images at different viewing points are projected. This system has the problems of an increase in the amount of image information, difficulty in optical system adjustment, and so on. In the optical system moving system, the viewing line position of the viewer is constantly detected, and, on the basis of the detected information, the optical system is operated so as to change the image on the lenticular screen, thereby correctly projecting an image matched with the viewing line position onto the eyes of the viewer. In this optical system moving system, it is difficult to operate the optical system with high accuracy, and the operation system becomes too large. The present invention may also be applied to a stereoscopic display based on the above-described lenticular system, thereby expanding the stereoscopic-view-possible range.

Figure 13:
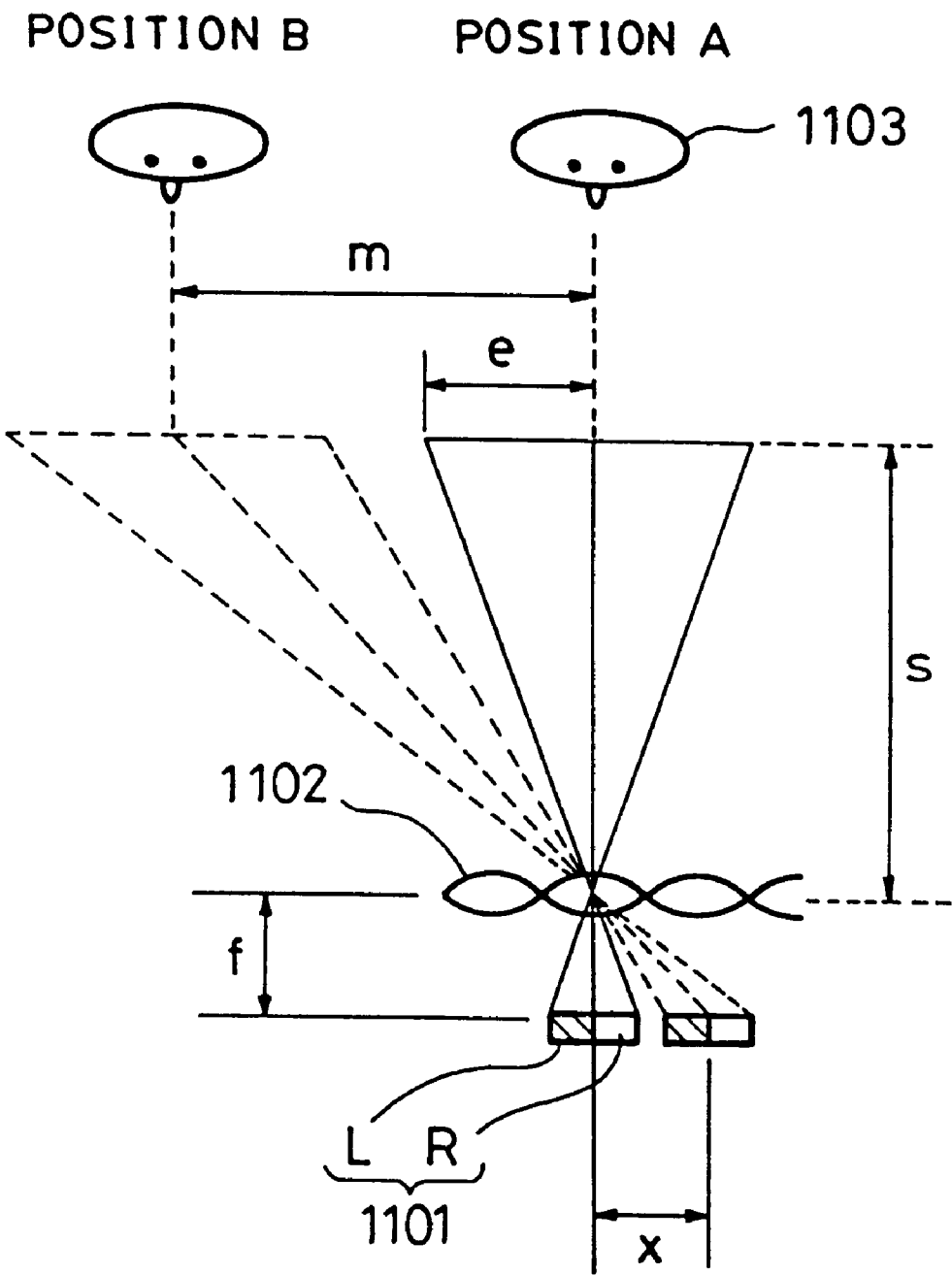
FIG. 13 is a diagram illustrating an eighth embodiment.

This is achieved in the eighth embodiment of the present invention shown in FIG. 13. In the drawing, numeral 1101 indicates a pair of display pixels; numeral 1102 indicates a lenticular lens; and numeral 1103 indicates a viewer. Symbols L and R allotted to the pair of display pixels respectively indicate left-eye and right-eye images projected onto the focal plane of the lenticular screen. Symbol f indicates the focal length of the lenticular lens 1102, and symbol s indicates the visual range of the viewer 1103. The pair of display pixels 1101 are projected in an enlarged state through the lenticular lens 1102, and the focal length f is selected such that a width of $2e$ (e=65 mm, the average value of the distance between the eyes) is obtained at the visual range of s. When the viewer is at position A, the left-eye image L and the right-eye image R respectively enter the left and right eyes of the viewer, so that the viewer can observe a stereoscopic image. If, in this condition, the viewer 1103 moves to the right or left by the distance e, a correct image cannot enter the eyes, so that no stereoscopic view is possible. In view of this, when the viewer 1103 has moved through a distance m to reach position B, the display image 1101 is moved in the reverse direction by a distance x so that the right-eye and left-eye images can always be projected onto the right and left eyes, respectively, of the viewer 1103, allowing the viewer to continue to observe a stereoscopic image. That is, when the distance of movement m of the central position of the viewing point of the observer is constantly detected, and the display area of the display is moved in the opposite direction by the distance x in accordance with the present invention, it is always possible to give a stereoscopic display regardless of a movement to the right or left of the viewer. The distance of movement x can be obtained by the following equation:

$$x = m \cdot f / s$$

Due to this arrangement, it is possible to realize a highly accurate, lenticular-type stereoscopic display which provides a stereoscopic view over a wide range, without involving an increase in the amount of image information or requiring a large operation system.

(Ninth Embodiment)

Recently, a head mount display system (hereinafter referred to as "HMD") has been developed as a method of realizing a stereoscopic image. In the head mount display system, independent display members (for example, liquid crystal panels or small-sized CRT) are respectively allotted to the right and left eyes to respectively project right and left images thereto, thereby displaying a realistic stereoscopic image.

Figure 14A:
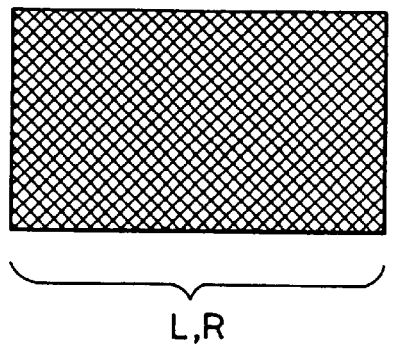
FIGS. 14(a)–(c) constitute a schematic diagram showing a display example in a conventional head mount display.
Figure 14B:
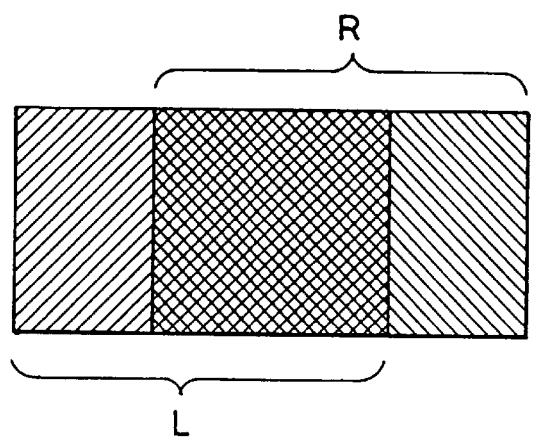
Figure 14C:
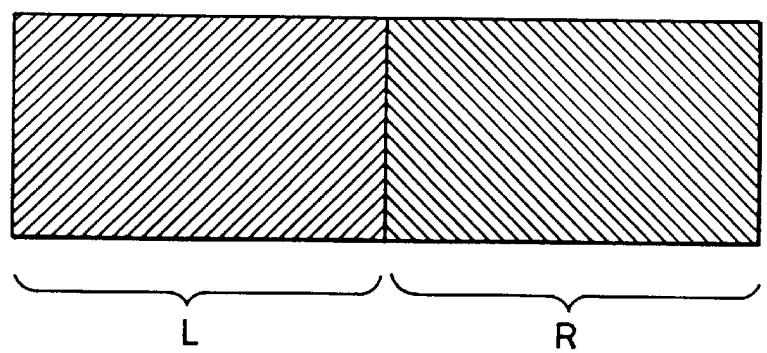

FIGS. 14(a)–(c) illustrate an example of a display obtained by the HMD system. In the drawing, symbol L indicates an image projected onto the left eye, and symbol R indicates an image projected onto the right eye. By operating the optical system, the right and left images are combined into one stereoscopic image for display, as shown in FIG. 14(a). Further, by operating the optical system, it is possible to provide a display whose central area is stereoscopic but whose peripheral areas are plane, as shown in FIG. 14(b), or a plane image display of a wide angle of view, as shown in FIG. 14(c). Thus, it is possible to obtain different types of display according to the intended purpose.

Conventionally, such functions have been realized by mechanically operating the optical system, leading to the following problems: a complicated structure, low accuracy, large and heavy mechanism, unsuitability for head mount, and so on. These problems can be easily solved by applying the present invention to the HMD.

Figure 15A:
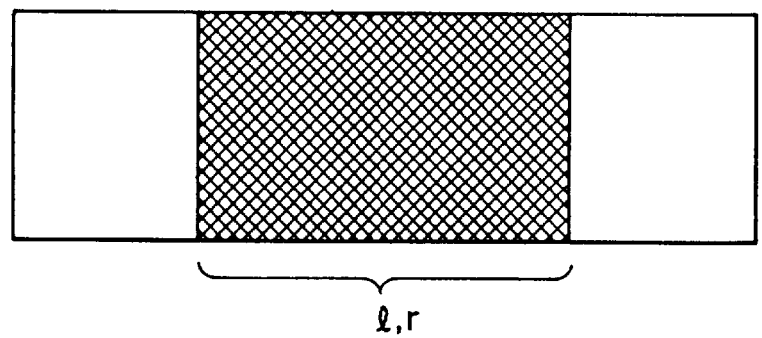
FIGS. 15(a)–(c) constitute a schematic diagram showing a display example of a head mount display according to a ninth embodiment.
Figure 15B:
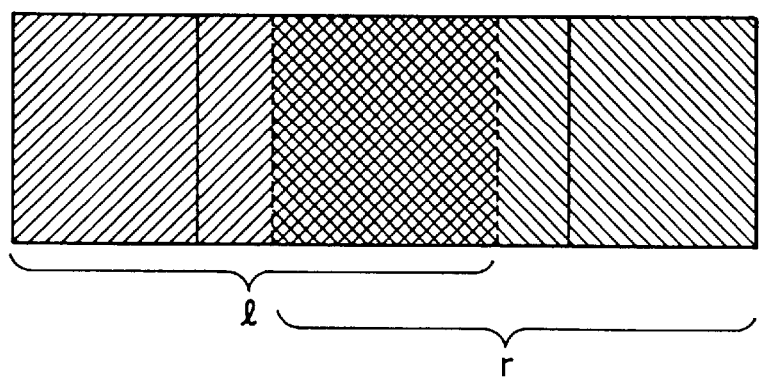
Figure 15C:
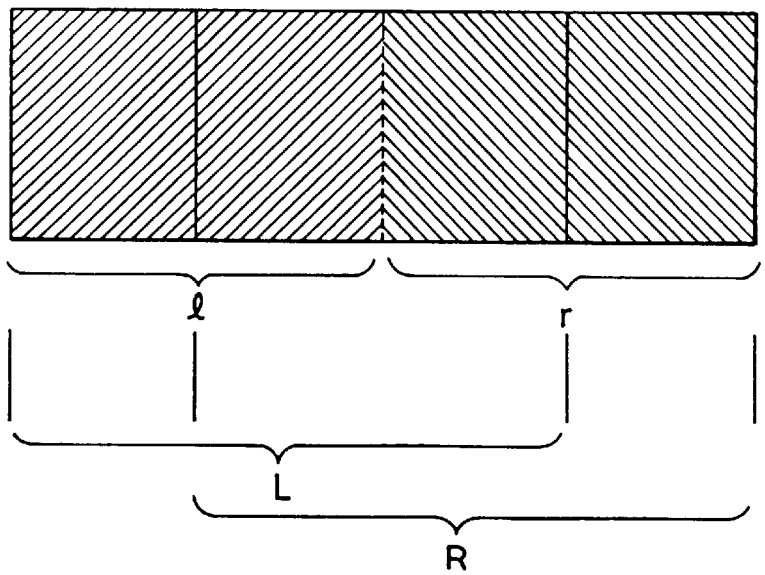

This is achieved in the ninth embodiment of the present invention, which is shown in FIGS. 15(a)–(c). In the drawings, symbol L indicates an image area projected onto the left eye, and symbol R indicates an image area projected onto the right eye. According to the present invention, an arbitrary display position in the area L or R is imparted to the actual image. In accordance with the present invention, the display position of the image is changed such that a stereoscopic image is displayed which is composed of an image 1 projected onto the left eye and an image r projected onto the right eye, as shown in FIG. 15(a), or that a stereoscopic image is displayed in the central region of the screen and plane images in the peripheral regions, as shown in FIG. 15(b), or that a plane image of a wide angle of view is displayed, as shown in FIG. 15(c). Such displays can be easily realized without having to provide a mechanically movable section.

As described above, in accordance with the present invention, it is possible to switch the image display area to an arbitrary position. Thus, it is possible to realize a common use of the NTSC and PSL systems, a stereoscopic display device of a wide angle of view, a high-performance head mount display having no movable sections, and so on.

What is claimed is:

1. A binocular head mount display device comprising:

a mounted pair of matrix display panels;

an optical assembly arranged relative to said mounted pair of matrix display panels so that image areas of respective display panels are viewable by the left eye and the right eye of a viewer; and a drive circuit for driving each of said matrix display panels to display a respective left-eye display image and a right-eye display image thereon, wherein:

said optical assembly is arranged, so that in the field of view of the viewer, the image area of the display panel viewable by the left eye of the viewer, and the image area of the display panel viewable by the right eye of the viewer, are viewable as having a common area where parts of each image area are superimposed; and said drive circuit includes selecting means for selecting different start columns for display of each display image on the respective image areas of said display panels, to position the display images relative to said image areas of the display panels according to viewing mode, which viewing mode is changeable between the following modes: a full stereoscopic viewing mode in which the display images are viewable in said common area; a partial stereoscopic viewing mode in which a right portion of the display image, viewable by the left eye, and a left portion of the display image, viewable by the right eye, are viewable as a stereoscopic image portion at the center of the field of view of the viewer, and the peripheral left portion of the display image, viewable by the left eye, and the peripheral right portion of the display image, viewable by the right eye, are viewable as non-stereoscopic image portions to the left and right of the center stereoscopic image portion of the field of view; and a wide-angle viewing mode in which the display images are viewable in abutment, wherein said drive circuit comprises, for each matrix display panel:

a signal line for supplying a video signal; and a plurality of switches each connected between said signal line and either a respective one of columns of the respective display panel or a respective one of an array of latched amplifiers connected to a respective one of said columns, and wherein said selecting means includes:

a shift register for supplying a shift pulse sequentially to said switches connected to said columns or amplifiers;

a selection circuit, cooperative with said shift register, responsive to a column start position control signal, to determine the start position of the shift pulse applied sequentially to said switches by said shift register; and a control signal generator for supplying said column start position control signal to control the start position of said shift pulse so that it is applied to a switch corresponding to an appropriate column start position for a given viewing mode.

2. A binocular head mount display device comprising:

a mounted pair of matrix display panels;

an optical assembly arranged relative to said mounted pair of matrix display panels so that image areas of respective display panels are viewable by the left eye and the right eye of a viewer; and a drive circuit for driving each of said matrix display panels to display a respective left-eye display image and a right-eye display image thereon, wherein:

said optical assembly is arranged, so that in the field of view of the viewer, the image area of the display panel viewable by the left eye of the viewer, and the image area of the display panel viewable by the right eye of the viewer, are viewable as having a common area where parts of each image area are superimposed; and said drive circuit includes selecting means for selecting different start columns for display of each display image on the respective image areas of said display panels, to position the display images relative to said image areas of the display panels according to viewing mode, which viewing mode is changeable between the following modes: a full stereoscopic viewing mode in which the display images are viewable in said common area; a partial stereoscopic viewing mode in which a right portion of the display image, viewable by the left eye, and a left portion of the display image, viewable by the right eye, are viewable as a stereoscopic image portion at the center of the field of view of the viewer, and the peripheral left portion of the display image, viewable by the left eye, and the peripheral right portion of the display image, viewable by the right eye, are viewable as non-stereoscopic image portions to the left and right of the center stereoscopic image portion of the field of view; and a wide-angle viewing mode in which the display images are viewable in abutment, wherein said drive circuit further comprises:

a dummy signal line for supplying a dummy signal;

a second array of switches, connected between said dummy signal line and either a group of said columns or a group of said amplifiers at the left side of the display panel viewable by the left eye, responsive to said column start position control signal, to connect the dummy signal line to those columns or amplifiers starting from the first column or first column amplifier and ending with the last column or last column amplifier preceding the selected start column or column amplifier of the display panel viewable by the left eye;

a third array of switches, connected between said dummy signal line and either a group of said columns or a group of said amplifiers at the right side of the display panel viewable by the right eye, responsive to a column terminal position control signal, to connect said dummy signal line either to those columns or amplifiers starting from the first column or first column amplifier following the selected terminal column or column amplifier and ending with the last column or column amplifier of the display panel viewable by the right eye; and a control signal generator for supplying said column terminal position control signal, for a given viewing mode.

* * * * *

UNITED STATES PATENT AND TRADEMARK OFFICE
CERTIFICATE OF CORRECTION

| | |
|---|---|
| PATENT NO. | : 6,046,711 |
| DATED | : April 4, 2000 |
| INVENTOR(S) | : Tetsunobu Kouchio |

It is certified that error appears in the above-identified patent and that said Letters Patent is hereby corrected as shown below:

ON THE TITLE PAGE:
    [56] References Cited, Under FOREIGN PATENT DOCUMENTS
    "3189683A" should read —3-189683A—.

COLUMN 1:
    Line 30, "VcoM" should read —Vcom—.

COLUMN 9:
    Line 17, "PSL" should read —PAL—.

Signed and Sealed this

Fifth Day of June, 2001

*Attest:*

NICHOLAS P. GODICI

*Attesting Officer*

*Acting Director of the United States Patent and Trademark Office*